(12) United States Patent
Maiocco et al.

(10) Patent No.: US 8,185,619 B1
(45) Date of Patent: May 22, 2012

(54) ANALYTICS SYSTEM AND METHOD

(75) Inventors: James Maiocco, Seattle, WA (US); Brad Belanger, Seattle, WA (US); Brian Mansell, Seattle, WA (US); John McCaskey, Seattle, WA (US)

(73) Assignee: Compuware Corporation, Detroit, MI (US)

( * ) Notice: Subject to any disclaimer, the term of this patent is extended or adjusted under 35 U.S.C. 154(b) by 246 days.

(21) Appl. No.: 11/770,427

(22) Filed: Jun. 28, 2007

Related U.S. Application Data

(60) Provisional application No. 60/816,986, filed on Jun. 28, 2006.

(51) Int. Cl.
*G06F 15/173* (2006.01)
*G06F 15/16* (2006.01)
*G06F 15/177* (2006.01)

(52) U.S. Cl. ......... 709/224; 709/203; 709/219; 709/220

(58) Field of Classification Search .................. 709/223, 709/220, 203, 219, 224
See application file for complete search history.

(56) References Cited

U.S. PATENT DOCUMENTS

| | | | | |
|---|---|---|---|---|
| 5,815,652 A * | 9/1998 | Ote et al. | | 714/31 |
| 5,822,532 A * | 10/1998 | Ikeda | | 709/224 |
| 5,987,513 A * | 11/1999 | Prithviraj et al. | | 709/223 |
| 6,282,175 B1 * | 8/2001 | Steele et al. | | 370/254 |
| 6,339,750 B1 * | 1/2002 | Hoyer et al. | | 702/182 |
| 6,480,901 B1 * | 11/2002 | Weber et al. | | 709/246 |
| 6,490,620 B1 * | 12/2002 | Ditmer et al. | | 709/224 |
| 6,611,863 B1 * | 8/2003 | Banginwar | | 709/220 |
| 6,708,137 B2 * | 3/2004 | Carley | | 702/179 |
| 6,751,663 B1 * | 6/2004 | Farrell et al. | | 709/224 |
| 6,973,491 B1 * | 12/2005 | Staveley et al. | | 709/224 |
| 7,054,901 B2 * | 5/2006 | Shafer | | 709/203 |
| 7,065,566 B2 * | 6/2006 | Menard et al. | | 709/223 |
| 7,076,543 B1 * | 7/2006 | Kirti et al. | | 709/223 |
| 7,096,264 B2 * | 8/2006 | Bonney et al. | | 709/224 |
| 7,203,173 B2 * | 4/2007 | Bonney et al. | | 370/242 |
| 7,353,269 B2 * | 4/2008 | Aki et al. | | 709/224 |
| 7,363,656 B2 * | 4/2008 | Weber et al. | | 726/23 |
| 7,370,103 B2 * | 5/2008 | Hunt et al. | | 709/223 |
| 7,454,496 B2 * | 11/2008 | Kundu | | 709/224 |
| 7,509,414 B2 * | 3/2009 | Agarwal et al. | | 709/224 |
| 7,769,850 B2 * | 8/2010 | Silverman | | 709/224 |
| 7,792,948 B2 * | 9/2010 | Zhao et al. | | 709/224 |
| 2002/0161883 A1 * | 10/2002 | Matheny et al. | | 709/224 |
| 2003/0110252 A1 * | 6/2003 | Yang-Huffman | | 709/224 |
| 2004/0186903 A1 * | 9/2004 | Lambertz | | 709/224 |
| 2005/0021723 A1 * | 1/2005 | Saperia | | 709/223 |
| 2006/0179124 A1 * | 8/2006 | Stefaniak et al. | | 709/219 |
| 2007/0130322 A1 * | 6/2007 | Cambron et al. | | 709/224 |
| 2007/0288633 A1 * | 12/2007 | Mullarkey | | 709/224 |
| 2008/0201465 A1 * | 8/2008 | Jones et al. | | 709/224 |

OTHER PUBLICATIONS

An Enterprise Database Performance Comparison of the Dell PowerEdge 2950 and the Sun Fire V490 UltraSPARC Server by Dave Jaffe, Oct. 2006.*
BEA WebLogic Application Servers, By Dave Jaffe, Part 3, Issue 2, 2001.*
"Klir Analytics for Application" Klir Technologies, Inc., (www.klir. com), 2006, 5 pages.

* cited by examiner

*Primary Examiner* — Kamal Divecha
(74) *Attorney, Agent, or Firm* — Fenwick & Weet LLP

(57) ABSTRACT

An agentless software data collector in a customer computer network collects metrics data from managed devices on the network to provide to a remote data center accessed via a public wide area network (WAN) interface. The software data collector collects metrics data, as well as receives real-time queries, such as from a Remote Procedure Call (RPC) initiated from a hosted web interface.

16 Claims, 2 Drawing Sheets

ANALYTICS SYSTEM AND METHOD

CROSS-REFERENCE TO RELATED APPLICATIONS

This application claims the benefit of priority of U.S. Provisional Application No. 60/816,986, filed Jun. 28, 2006, which is incorporated herein by reference in its entirety.

BACKGROUND

The present invention relates to systems and methods for providing analytics to a public wide area network (WAN) interlace for devices on a customer computer network.

Conventional distributed computing environments use a variety of methods to communicate data between clients and servers. One technology known as Remote Procedure Calls (RPC) allows an application in one location to trigger a subroutine or procedure to execute in another location. This RPC triggering in a client/server scheme typically requires agents or direct established connection with an agent to employ RPC. When employed for managing network resources, RPC agents are required on all devices on the network for which data is being gathered. The burden of agents on every device poses many problems. First, the management task to ensure installation and operation of all agents is significant. Second, many devices from which resource data is desired are incapable of executing and supporting an agent. In devices that do support agents, the available data about the resource may be limited to the agent's capabilities. Further, many devices are not configured to handle the load or operation of a data gathering agent. An agent-based architecture for monitoring resources on a network is therefore burdensome and unreliable, particularly where metrics are collected from different types of resources and necessary to generate desired analytics of the collective network resources.

Accordingly there is a need for an agentless system and method to provide analytics for managed devices in a customer computer network. There is also a need for providing analytics for various types of resources and respective metrics targeted for management on the desired computer network.

SUMMARY OF THE INVENTION

To answer these needs, in one embodiment the present invention includes a method for providing analytics for a plurality of devices in a customer computer network via a public wide area network interface. The method includes providing a customer agentless software data collector within the customer computer network; collecting analytics data from the plurality of devices with the customer agentless software data collector; sending the analytics data from the customer agentless software data collector to a remote data center on a public wide area network; where appropriate, normalizing and aggregating analytics data; receiving a request for analytics data for one or more of the plurality devices from a public wide area network interface to the remote data center; and displaying analytics data for one or more of the plurality devices in response to the request.

In some embodiments the public wide area network is the Internet and the public wide area network interface is a web browser. In further embodiments of the invention, the public wide area network includes wired and wireless public networks.

In embodiments of the invention, a customer computer network includes one or more of a customer's wide area network, local area network, virtual network, fiber network and combinations thereof, including wired and/or wireless networks.

In another embodiment, the invention further comprises communicating one or more remote procedure calls between the public wide area network interface and the customer agentless software data collector. In some embodiments the remote procedure call(s) initiate system discovery at the customer agentless software data collector, initiate changes to the settings of the customer agentless software data collector and/or initiate the customer agentless software data collector to respond to a real-time analytics inquiry.

In a further embodiment, the customer agentless software data collector actively polls analytics data from the plurality of devices at predetermined time intervals.

Another embodiment of a method of the invention further includes abstracting a common metric from disparate metric data from two or more devices of the plurality devices and displaying a comparison of the two or more devices as to the common metric in the public wide area network interface. In some embodiments, a method of the invention includes calculating a composite metric as the common metric for at least one of the two or more devices.

In other embodiments, the inventions includes a system for providing analytics for a plurality of devices in a customer computer network via a public wide area network interface comprising: a customer agentless software data collector within the customer computer network collecting analytics data from the plurality of devices; a remote data center on a wide area network receiving analytics data from the customer agentless software data collector, wherein the remote data center is accessible from a public wide area network interface; and a reporting engine for providing analytics data for one or more of the plurality devices to the public wide area network interface.

In one embodiment, a system of the invention includes one or more remote procedure calls communicated between the remote data center and customer agentless software data collector for remotely initiating an activity at the customer agentless software data collector. In embodiments, an activity includes, without limitation, changing a setting of the customer agentless software data collector, running system discovery and/or responding to a real-time query for analytics data.

In further embodiments, the customer agentless software data collector includes a configuration for passively collecting analytics data from the plurality of devices at predetermined time intervals.

DETAILED DESCRIPTION OF THE INVENTION

Embodiments of the invention will be described with reference to the accompanying drawings and figures wherein like numbers represent like elements throughout. Further, it is to be understood that the terms used herein are for the purpose of description and should not be regarded as limiting. The use of "including", "comprising", or "having" and variations thereof herein is meant to encompass the items listed thereafter and equivalents thereof as well as additional items. The terms "connected" is used broadly and encompass both direct and indirect connections. Further, "connected" is not restricted to physical or mechanical connections.

In one embodiment, the invention provides a centrally controlled and web-hosted data center application on a public wide area network, such an Application Service Provider (ASP) model, combined with a distributed agentless software data collector provided in a customer network that distributes load and monitors control of the customer network(s) and monitored devices. The agentless software data collector operates locally in a customer's data center(s), including across the globe, while the data center central application maintains the clustered (high availability) database and hosted web-based user interface.

In some embodiments a public wide area network includes the Internet and a web-based interface includes an Internet browser. In other embodiments custom applications may be provided as interfaces to the data center application hosted on a public wide area network. In other embodiments, public wide area networks may include other wired and wireless public networks beyond the Internet.

As used herein, customer computer network is distinguished from the open public wide area network, such as the open Internet, as including a customer's wide area network, local area network, virtual network, fiber network and combinations thereof, including wired and/or wireless networks. An agentless software data collector of the present invention operates on at least one computing device in the customer network. In embodiments of the invention the software data collector is installed from a download or from a storage medium. In other embodiments, the data collector is provided pre-loaded on a hardware device to or systems software used by the customer.

Figure 1:
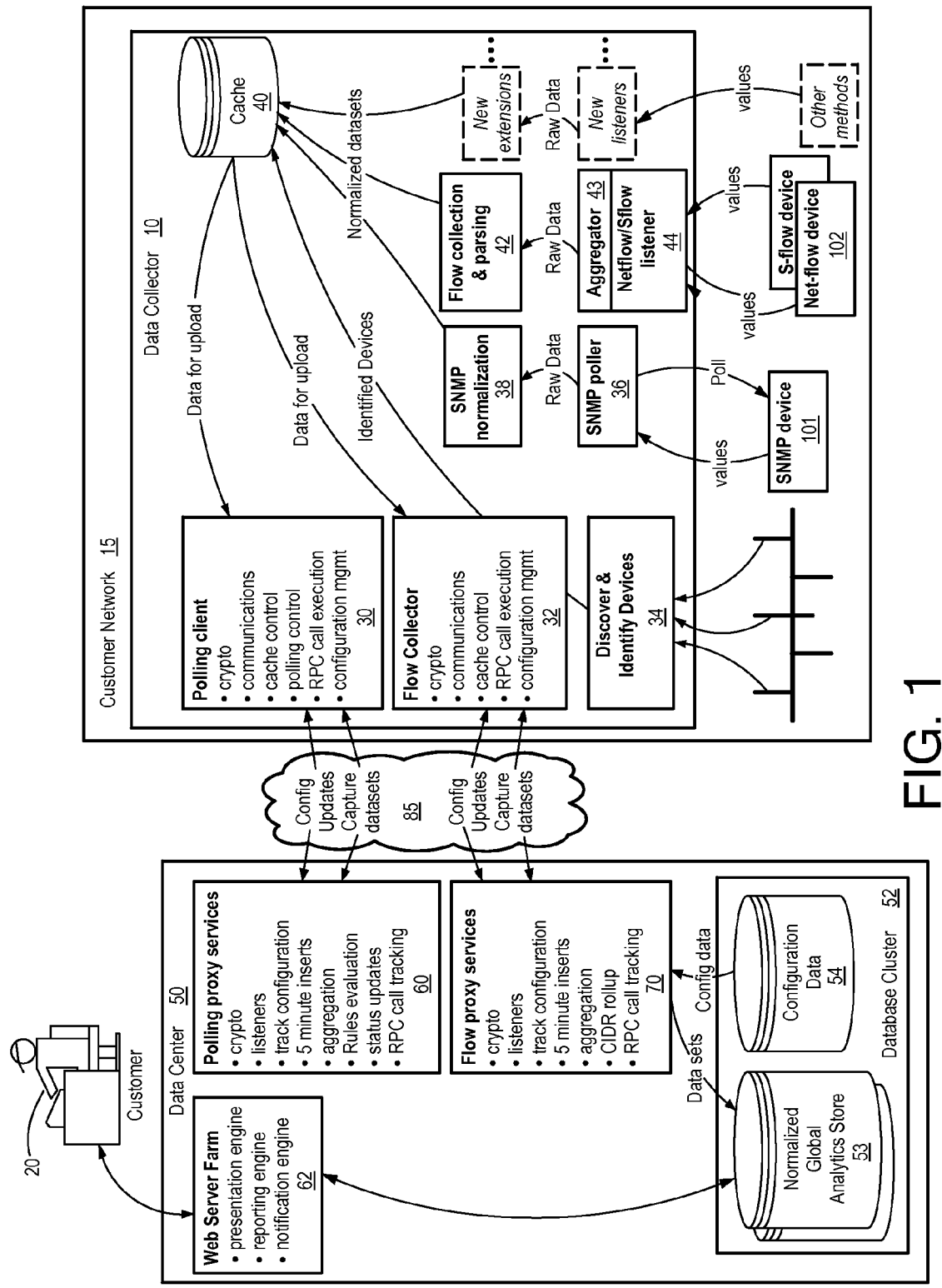
FIG. 1 is a schematic relational block diagram of a remotely manageable customer device metrics data collection system architecture in an embodiment of the present invention.
Figure 2:
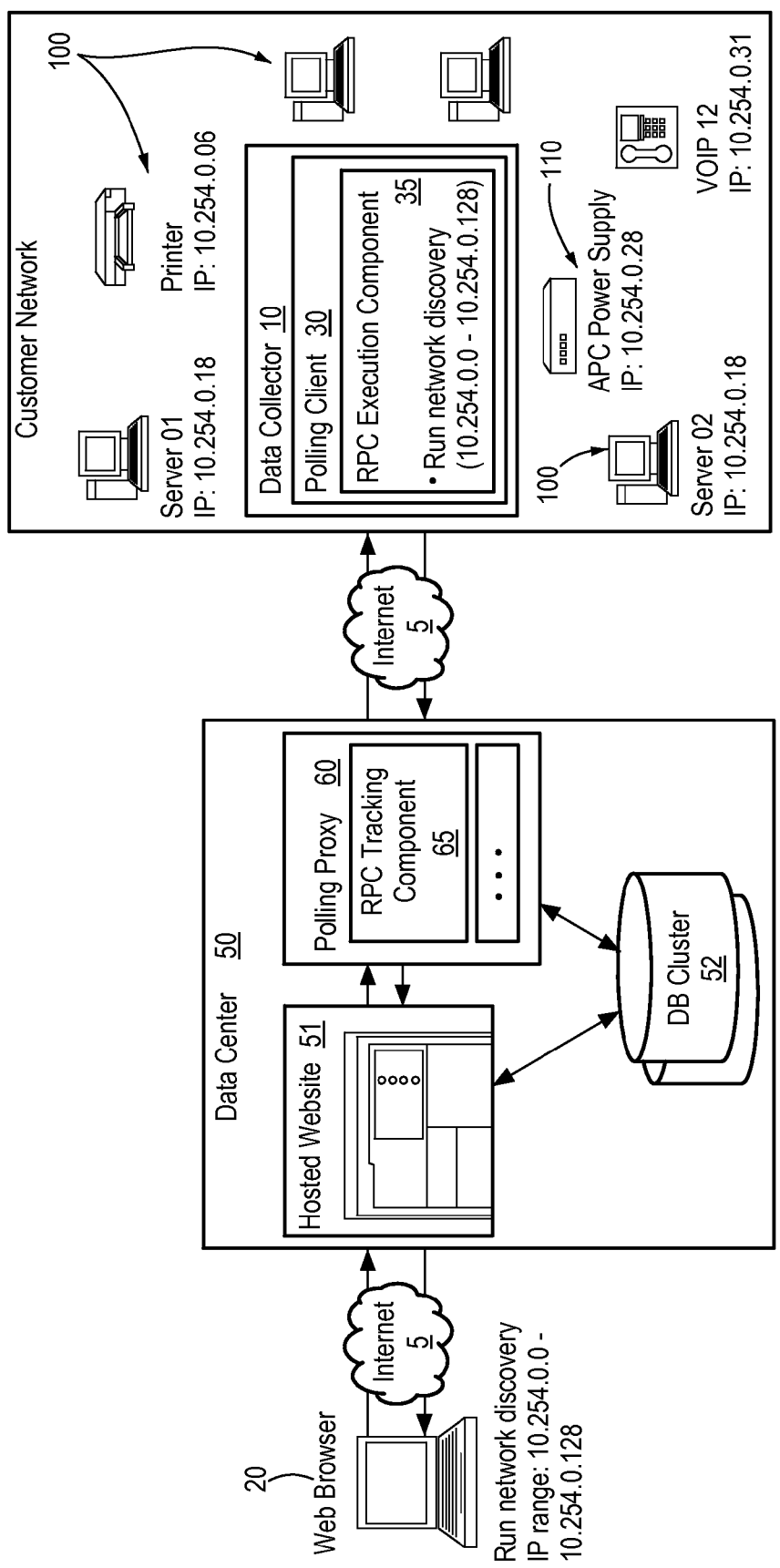
FIG. 2 is a schematic relational block diagram depicting Remote Procedure Calls initiated from a public wide area network interface and exchanged over a wide area network between a remote data center and customer network-based agentless software data collector in an embodiment of the present invention.

Referring to FIGS. 1 and 2, a high level architecture of an embodiment of the invention includes a customer network 15 with devices 100 from which collection of metrics data is desired. The customer network 15 includes a software data collector 10 connected to a remote data center 50 on a public wide area network 5, such as the Internet. The software data collector 10 collects metrics data from the monitored devices 100 and provides the data to the data center 50. A customer accesses analytics based on the metrics data from the remote data center 50 via a public wide area network interface 20, such as a web browser.

With reference to FIG. 1, data collector 10 in the customer network 15 comprises several components.

A polling client 30 actively collects data which has been aggregated in monitored devices 100, with a predetermined polling frequency. For example, the polling client 30 polls all desired SNMP devices 101 for metrics data, including performance and utilization data from the customer environment the polling client 30 has been configured to monitor. In embodiments, configuration is done centrally from the data center 50 (discovering devices for the data collector 10) and then transferred down to the data collector 10. In embodiments, polling client 30 includes the following functional components: crypto, communications, cache control, polling control, RPC call execution and configuration mgmt.

Crypto components of polling client 30 interact with the polling proxy services 60 in the data center 50 with a high-level of security.

Communications component of polling client 30 is responsible for the basic data transmission to and from the data center 50. It initiates communications at predetermined intervals, such as every 5 minutes (or as otherwise configured), for transferring data to the data center 50, and passes configuration data to be stored locally in the data collector 10.

Cache control of polling client 30 is used when communications to the data center 50 is not possible, and monitoring data becomes available on the data collector 10. The monitoring data is then stored in the local cache 40 until the communications component gets a connection to the data center 50 for transmission. This buffering adds reliability to the data collected, and minimizes the effects of unreliable communications link to the remote data center 50.

Polling control component of polling client 30 invokes the polling threads periodically (such as 5 minute intervals) to start the polling of SNMP devices 101 for SNMP data. In one embodiment, the polling threads are multiple independent threads. In other embodiments, polling control component invokes API calls. Polling control handles the throttling of the polling activity up to some maximum number of concurrent polling processes at any given time. This ensures the data collector 10 with the hardware it is running on is executing efficiently; eliminating, for example, excess CPU thrashing, memory swapping, and context switching. Polling control also control the polling thread completion, and resource release tasks.

RPC call execution component of polling client 30 receives remote procedure call(s) from data center 50, and executes them in real time and reports the results & completion status back to the data center 50. These calls include, without limitation, configuration changes, addition of new metrics and receiving software upgrade commands.

Configuration mgmt component of polling client 30 maintains locally stored configuration data on durable storage, making updates, and reporting current configuration version.

A flow collector 32 is another component of data collector 10 in embodiments of the invention. The monitoring activities on the data collector 10 are divided up between data collection, such as SNMP collection, and flow collection. In embodiments, these two activities are independent, including having their own respective installation routines in further embodiment. The independent embodiments enable the software footprint on the data collector 10 to remain as small as possible. For instance, if flow is not to be captured, flow collector 32 and its associated components may not be installed permitting a scaling up of SNMP monitoring if needed. In embodiments of the invention, flow collector 32 has similar functional components as the polling client 30 including: crypto, communications, cache control, RPC call execution and configuration mgmt (management).

Crypto component of the flow collector 32 interacts with the flow proxy services 70 in the data center 50 with a high level of security.

The communications component of the flow collector 32 is responsible for the basic data transmission to and from the data center 50. It initiates the communications every 5 minutes for transferring data to the data center 50, and passes any configuration data to be stored locally in the data collector 10.

Cache control is used when communications to the data center 50 is not possible, and monitoring data becomes available on the data collector 10. The monitoring data is then stored in the local cache until the communications component gets a connection to the data center 50 for transmission to the data center 50. This buffering adds reliability to the data collected, and minimizes the effects of unreliable communications link to the data center 50.

RPC call execution component of the flow collector 32 receives remote procedure call(s) from the data center 50, and executes them in real time reporting the results & completion status back to the data center 50. These calls include, without limitation, configuration changes, addition of new metrics and receiving software upgrade commands.

Configuration management component of the flow collector 32 maintains the locally stored configuration data on durable storage, making updates, and reporting current configuration version.

In further embodiments of the invention, a SNMP poller 36 is a worker thread spawned by the polling control of polling client 30 to actively conduct device polling work from the target device 100 with SNMP get verbs.

In embodiments, SNMP poller 36 invokes SNMP normalization 38, such as an independent copy Python engine (process) for normalizing the SNMP polling data suitable for sending to the data center 50. The Python engine executes (interprets) the specific Python extensions, which are specifically created for each metric collected, manipulating the raw data to the desired form. Since these are executing as interpreted code in separate processes, manipulating only data for a metric, possible inference across metrics is avoided. This enables the reliable rapid development cycles for adding and maintaining the metrics.

In embodiments of the invention, NetFlow (Nflow)/Sflow listener 44 provides "passive" collection as opposed to "active" collection of SNMP poller 36, since target devices 100, such as NetFlow or S-flow devices 102, are not probed for monitoring data. Listeners 44 instead listen and capture the transmissions from these devices. The devices collecting flow data, have been configured to send the data (aggregated or not) to the listeners IP address and UDP port.

In embodiments of the invention, Nflow/Sflow aggregator 43 gets the transmitted data from the listener 44, and aggregates if needed when the set time slice bucket (such as 5 minutes) is still receiving data from the device 102. When the device sends time slice expiration message, signaling the bucket is completed, the aggregator 43 calls the flow parser 42 to prepare the data.

The flow parser 42 interprets the flow data collected and aggregated, and converts the data to be ready for storing in the data center 50.

In embodiments of the invention, discovery process 34 is initiated by request of the customer from the data center 50 individually for each data collector 10. The start discovery command, as well as the needed parameters are passed to the discovery process via the RPC command execution channel. The discovery process probes all the IP addresses specified in the discovery parameters, identifies each device's supported protocols and pertinent identification information, returning the results back to the customer interface 20 initiating the discovery.

With continuing reference to FIG. 1, in one embodiment, data center 50 includes a web server farm 62. Web server farm 62 is the customer-facing, scalable and high-availability cluster of servers ensuring that customer access to the reports, dashboard, and alerts is readily available. Each web server hosts applications providing services, including, but not limited to: presentation engine, reporting engine and notification engine.

The presentation engine transforms the analytics data retrieved from the analytics store 53 of a database cluster 52 into a presentable format for a web browser 20, or similar interface. Technologies such as, and not limited to, AJAX, Asynchronous JavaScript and XML are used to partition the reports and dashboards for partial page refresh capability to improve the user experience.

The reporting engine handles formulating and performing mathematical calculations for the reported information deriving it from the data records retrieved from the analytics database 53.

The notification engine constantly monitors the error database for events needed to be forwarded to the users. The errors reported by the rules evaluation engine are analyzed, and appropriate emails, sms and pager messages are formed based on the data in the error record. These notifications are then disseminated to the right recipients as configured through the interface 20 by the customer in the alerts definitions.

Polling proxy services 60 at data center 50, such as implemented in a clustered set of servers, interface with one or more data collectors 10 in all the customer's sites around the world. All the communication with the customer's SNMP polling client 30 is done through this service. Polling proxy services 60 functions include, but are not limited to: crypto, listeners, track configuration, 5 minute inserts (or such other time interval as configured), aggregation, rules evaluation, status updates and RPC call tracking.

The polling proxy 60 uses the crypto components to encrypt communications between the data center 50 and data collector(s) 10 in customer network 15 with encryption methods.

Each poling proxy server 60 opens listener threads for each data collector 10. These listeners establish the secure communications link 85, such as over public wide area network 5, for transferring data between the customer network 15 and data center 50. In one embodiment, communications are initiated from the data collector 10, i.e. customer network 15, for improved security and control.

Configuration tracking component ensures data collector 10 runs the latest software version, as well as the latest customer configuration settings on the data collector 10. It retrieves the software and configuration version from the data collector 10, as well as the latest settings from the central configuration database 54. If there are differences in the versions, it starts the upload process, updating the data collector 10 with the desired configuration.

In an embodiment of the invention, 5-minute (or such other time interval) inserts of polling proxy 60 operates as follows. Once every 5 minutes (current analytics smallest collection granularity) the data collector 10 initiates metrics data transmission from the customer database, such as including cache 40. During the transmission, the configuration information is also transferred across a secured link, in an embodiment of the invention.

Aggregation of polling proxy 60 is a calculation component. The information coming from the data collector 10 has already been normalize in embodiment of the invention, and in most cases is ready to be inserted into the analytics store 53. In some cases additional aggregation and averaging is needed to complete the data entries for the metric template. For instance, when data is calculated from several sequential 5 minute transmissions, the aggregation component takes care of this calculation, as well as storing relevant information from the previous transmissions at hand.

Rules evaluation provides data comparison such as for alarm triggering in embodiments of the invention. After each insert of a 5 minute transmission into the analytics store 53, rules for generating alerts error records for dissemination to the alarm recipient are examined. The rules evaluation process evaluates for each alarm in the account by comparing the received/calculated data against the set or calculated threshold. Some alarms are of multiple threshold type, for each threshold is evaluated, and logic stored in the alarm definitions is used to determine if an alarm error record (trigger) needs to be inserted into the store 53. As described, the notification engine monitors these error records, and sends the alarms out to the recipient.

The status update component handles collected data from the customer-side data collector 10 that is in a form of a status rather than measured value. The status update ensures status is inserted into the analytics store 53.

With respect to RPC call tracking, RPC (remote procedure calls) are used to implement commands execution on the data collector 10 initiated from the data center 50; for example, a call may be to discover newly available metrics for a device 100. These requests are not queued up for the next 5 minute transmission, but an RPC call is initiated to the data collector 10 at the customer network 15 immediately. In one embodiment, RPC tracking component 65 keeps account of all the open (not completed) RPC calls waiting for a reply from the data collector 10, as well as the call initiator coordinating the call to a request-response pairs. If the data collector 10 fails to reply, the call is timed out, and cleared from the open call list, or if the initiator of the call fails to receive the reply, the call is flushed out of the list.

With continuing reference to FIG. 1, flow proxy services 70, such as implemented in a clustered set of servers, interfaces with data collector(s) 10. Communication with the customer's flow collector 32 in the data collector 10 is done through this service. Flow proxy services include, but are not limited to crypto, listeners, track configuration, 5 minute (or such other configured time interval) inserts, aggregation, CIDR rollup and RPC call tracking.

Like the polling proxy 60, the flow proxy 70 uses the crypto components to encrypt communication between the data center 50 and data collector 10 with encryption methods.

Each flow proxy server 70 opens listener threads for each flow collector 32 of the data collector 10. These listeners establish secure communications link 85 for transferring data between data collector 10 and data center 50, such as over a public wide are network 5. All the communications are initiated from the data collector 10's side for improved security and control.

Configuration tracking component of flow proxy 70 ensures data collector 10 runs the latest software version, as well as the latest customer configuration settings on the data collector 10. It retrieves the software and configuration version from the data collector 10, as well as the latest settings from the central configuration database 54. If there are differences in the versions, it starts the upload process, updating the data collector 10 with the desired configuration.

In an embodiment of the invention, 5-minute (or such other time interval) inserts of flow proxy 70 operates as follows. Once every 5 minutes (current analytics smallest collection granularity) the data collector 10 initiates metrics data transmission from the customer database, such as including cache 40. During the transmission, the configuration information is also transferred across a secured link, in an embodiment of the invention.

Aggregation of flow proxy 70 is a calculation component. The information coming from the data collector 10 has already been normalized in embodiment of the invention, and in most cases is ready to be inserted into the analytics store 53. In some cases additional aggregation and averaging is needed to complete the data entries for the metric template. For instance, when data is calculated from several sequential 5 minute transmissions, the aggregation component takes care of this calculation, as well as storing relevant information from the previous transmissions at hand.

In embodiments of the invention, most of the Nflow and Sflow data is aggregated already on the flow collector 32 in customer network 15, however, CIDR (Classless Inter-Domain Routing) rollup of flow proxy 70 performs the rollup to sub-network aggregation based on the IP address categorization performed centrally in the flow proxy server's CIDR rollup component.

RPC call tracking in flow proxy 70 is like RPC in proxy service 60. RPC (remote procedure calls) are used to implement commands execution on the data collector 10 initiated from the data center 50; for example, a call may be to discover newly available metrics for a device 100. These requests are not queued up for the next 5 minute transmission, but an RPC call is initiated to the data collector 10 at the customer network 15 immediately. In one embodiment, RPC tracking component 65 keeps account of all the open (not completed) RPC calls waiting for a reply from the data collector 10, as well as the call initiator coordinating the call to a request-response pairs. If the data collector 10 fails to reply, the call is timed out, and cleared from the open call list, or if the initiator of the call fails to receive the reply, the call is flushed out of the list.

The global analytics store 53 in embodiments of the invention, resides on a scalable server farm with redundant servers acting as a single database cluster. The metrics data after it has been normalized is stored in the analytics store 53. In one embodiment, the data store 53 scales out by addition of server clusters, each capable of handling several customer databases. Customers information is visible only on an account by account basis. The architecture also supports hierarchical account structure, where a super account has visibility to all sub account data.

In one embodiment, configuration data store 54 is also hosted in a scalable redundant server farm. This architecture is scalable, and one server cluster can host several isolated account's databases.

As described, in some embodiments, the invention supports multiple data collectors 10 in the same customer network 15, operating in the same location in fault tolerant manner, or in geographically dispersed locations offering reliable global distributed monitoring. Each data collector 10 is associated with an identifier allocated to a customer's account. The data collector 10 is validated using this identifier when it tries to connect to the data center 50. The software data collector 10 can be moved from one server to another, safely by uninstalling (un-registers from data center 50) it and reinstalling (re-registers with data center 50).

In embodiments, an architecture further includes the capability for users to control the distributed data collectors 10 and make real time requests of them from the central web-based user interface 20 (auto-discovery, real time device status checking, real time metric support discovery, real time monitoring of known flow source addresses, etc. . . . ) which immediately return data to the user from any number of data collectors 10 distributed around the globe.

Both the polling client 30 and the flow collector 32 have been architected to support easy expandability beyond protocols such as, but not limited to, SNMP, Sflow, and NetFlow, including WMI, WBEM, and SNMP walk. Addition of new components is also available in further embodiments, such as adding a new "DLL" in Windows operating environments and "exe" in Linux platform.

In embodiments, the inventions permits metrics combined from different data sources by providing an API and a platform for flexible, scriptable, and extensible network and device metrics which allow users and developers to create new metrics that combine multiple data points from a variety of sources including, but not limited to, SNMP, WMI, WBEM, SMI, ICMP, and Raw TCP/UDP communications into meaningful metrics that may perform a variety of calculations and manipulations on the data before storing the value.

Further embodiments of the invention include an isolated processing architecture that allows for metrics to be run in an isolated interpreter so that new metrics may be created at runtime and added to the system without the need for an extensive development and test cycle. Any individual metric is prevented from damaging the data used by other metrics or from crashing the system as a whole.

The present invention also enables abstracting and composition of metrics for unification of disparate data for representation in embodiments of the invention. Examples of a need for abstracting metrics includes: (1) unification of disparate metrics for representation including management, display, alerting, and reporting and (2) creation of "Composite Metrics" to aide monitoring and comprehension for disparate devices.

In the monitoring realm, metrics are represented by identifiers that are unique to the device and system. In other words, metrics on a Dell server are unique to that server and will typically be different than metrics on a Sun server. Not only does this increase the number of metrics necessary to monitor a network, it limits any relationships or correlations across a network or community. In embodiments of the invention, metrics are abstracted so that meaningful correlation and comparison can be accomplished. For example, a user might want to compare the availability of all the devices on their network. Availability is defined by different metrics for different device, and the present invention permits these metrics to be abstracted and tagged under the context of "Availability." This abstraction allows a user to compare and graph the "Availability" of different devices on their network even though the metrics involved for each device may be unique.

In some instances, it is also very helpful to monitor a certain behavior of a system but the distinct metric may not exist on that device. For example, many industry professionals monitor the "CPU Utilization" of their network devices to help determine the health of their network. While some devices, including Windows machines, have metrics designed to report CPU Utilization, others do not. A Sun machine is an instance of a device where the "CPU Utilization" metric does not typically exist.

"Composite Metrics" can be used in embodiments of the invention to represent desired metrics, even if they do not natively exist on a certain device. For the Sun machine, it has been determined that CPU Utilization can be calculated using the "CPU Nice", "CPU User", and "CPU System" metrics. Embodiments of the present invention recognize these metrics, create a new composite metric and calculate a value for "CPU Utilization." Data is collected for this composite metric during regular polling periods. These composite metrics can be aggregated, reported on, and used for alerting. The composite metrics therefore allow a user to immediately monitor information relevant to them without requiring an in-depth knowledge of device specific behavior.

In embodiments of the invention, data collector 10 has several methods for gathering and reporting data. One is "actively" polling data at desired time intervals, such as 5 minutes. This means the collector grabs data from devices 100 and send it to the data center 50, to allow monitoring of metrics, such as system performance, and create graphing/trending data for a relative timeframe. Another method is "passively" listening for data, such as by NetFlow and Sflow listener 42, and such data is also set to data center 50. Additionally, data collector 10 responds to real-time requests. For example, if the user wishes to run a network discovery, the user can initiate this action from an interface 20, such as a web interface on a computing device, and discovery will immediately begin on customer network 15 and the results displayed to the user in interface 20. Accordingly, the data collector 10 is enabled to communicate in distinct reporting and response methods, and provides an agentless data collector for network management.

Referring now to FIG. 2, one non-limiting example is illustrated for a user that wants to identify and monitor an APC power supply 110, among other potential devices 100, on customer network 15.

A user via an interface 20 to a public wide area network 5 logs into a hosted website 51 of data center 50 with applicable account information. The user selects to run network discovery on an IP range of 10.254.0.0-10.254.0.128 searching for APC power supply 110.

The website 51 initiates an RPC call via the RPC call tracking component 65 on the polling proxy service 60. The RPC call tracking component 65 passes the start discovery command and user-defined parameters to the data collector 10 on the customer network 15 via a secure communications link across public wide area network 5, such as the Internet.

The data collector routes 10 the command and parameters to the RPC call execution component 35 of the polling client 30.

The RPC call execution component 35 receives the start discovery command and parameters and initiates the discovery process.

The discovery process probes all the IP addresses specified in the discovery parameters and identifies supported protocols and pertinent identification information for each device 100 (the APC power supply was found at IP address 10.254.0.23).

The discovery process returns the results back to the data center polling proxy 60 via the polling client 30.

The website 51 receives the data from the polling proxy 60 and displays it to the user via the interface 20, such as a web browser.

Although the invention herein has been described with reference to particular embodiments, it is to be understood that these embodiments are merely illustrative of the principals and applications of the present invention. Accordingly, while the invention has been described with reference to the structures and processes disclosed, it is not confined to the details set forth, but is intended to cover such modifications or changes as may fall within the scope of the following claims.

What is claimed is:

1. A method for providing analytics for a plurality of devices in a predetermined customer computer network via a public wide area network interface using an agentless architecture, the method comprising:
   providing a customer agentless software data collector within the customer computer network;
   the customer agentless software data collector collecting analytics data from the plurality of devices using a data collection process and a flow collection process, wherein the plurality of devices are not executing data collection agents, and wherein the data collection process is independent from the flow collection process in that the data collection process includes installation routines distinct from installation routines of the flow collection process;

the customer agentless software data collector sending the analytics data to a remote data center on a public wide area network;

the remote data center receiving a request for analytics data for one or more of the plurality of devices from a public wide area network interface;

displaying analytics data for one or more of the plurality of devices in response to the request;

communicating one or more remote procedure calls between the public wide area network interface and the customer agentless software data collector, the public wide area network interface being a web browser;

the customer agentless software data collector actively polling analytics data from the plurality of devices at predetermined time intervals;

the customer agentless software data collector obtaining, in response to said actively polling analytics data, two or more first device metrics from a first one of the plurality of devices and two or more second device metrics from a second one of the plurality of devices, the two or more first device metrics being different than the two or more second device metrics;

creating a definition of a new, composite metric using an application programming interface (API), wherein the new, composite metric does not natively exist on one or more of the plurality of devices;

the customer agentless software data collector accessing the definition of the new, composite metric;

the customer agentless software data collector calculating the new, composite metric from the two or more first device metrics and the two or more second device metrics; and displaying a comparison of the first one of the plurality of devices and the second one of the plurality of devices as to the new, composite metric.

2. The method of claim 1, further comprising remotely initiating system discovery at the customer agentless software data collector with the one or more remote procedure calls.

3. The method of claim 1, further comprising remotely initiating changes to settings of the customer agentless software data collector with the one or more remote procedure calls.

4. The method of claim 1, further comprising initiating the customer agentless software data collector with the one or more remote procedure calls to respond to a real-time analytics inquiry.

5. The method of claim 4, further comprising passively polling analytics data from the plurality of devices with the customer agentless software data collector at predetermined time intervals.

6. The method of claim 1, further comprising normalizing and aggregating metric data from one or more of the plurality of devices.

7. A system for providing analytics for a plurality of devices in a predetermined customer computer network via a public wide area network interface using an agentless architecture, the system comprising:

a customer agentless software data collector within the customer computer network collecting analytics data from the plurality of devices using a data collection process and a flow collection process, wherein the plurality of devices are not executing data collection agents, and wherein the data collection process is independent from the flow collection process in that the data collection process includes installation routines distinct from installation routines of the flow collection process;

a remote data center on a wide area network receiving analytics data from the customer agentless software data collector, wherein the remote data center is accessible from the public wide area network interface;

a reporting engine for providing analytics data for one or more of the plurality of devices to the public wide area network interface;

communicating one or more remote procedure calls between the public wide area network interface and the customer agentless software data collector for remotely initiating an activity at the customer agentless software data collector, the public wide area network interface being a web browser;

the customer agentless software data collector actively polling analytics data from the plurality of devices at predetermined time intervals;

the customer agentless software data collector obtaining, in response to said actively polling analytics data, two or more first device metrics from a first one of the plurality of devices and two or more second device metrics from a second one of the plurality of devices, the two or more first device metrics being different than the two or more second device metrics;

creating a definition of a new, composite metric using an application programming interface (API), wherein the new, composite metric does not natively exist on one or more of the plurality of devices;

the customer agentless software data collector accessing the definition of the new, composite metric; and the customer agentless software data collector calculating the new, composite metric from the two or more first device metrics and the two or more second device metrics and displaying a comparison of the first one of the plurality of devices and the second one of the plurality of devices as to the new, composite metric.

8. The system of claim 7, wherein the activity is changing a setting of the customer agentless software data collector.

9. The system of claim 7, wherein the activity is running system discovery.

10. The system of claim 7, wherein the activity is responding to a real-time query for analytics data.

11. The system of claim 10, wherein the customer agentless software data collector includes a configuration for passively collecting analytics data from the plurality of devices and reporting the data at predetermined time intervals.

12. The method of claim 5, wherein passively polling analytics data includes polling predetermined SNMP devices for metrics data, the metrics data including performance and usage data from the customer computer network.

13. The method of claim 1, further comprising:
maintaining, via the remote data center, polling proxy services and flow proxy services, the polling proxy services being independent from the flow proxy services.

14. The method of claim 1, further comprising:
receiving a request to monitor a specific behavior of the customer computer network, wherein a metric corresponding to the specific behavior is not provided by the plurality of devices in the customer computer network;
identifying multiple metrics, provided by the plurality of devices, that are related to the specific behavior; and
wherein calculating a new, composite metric is for reporting the specific behavior based on the identified multiple metrics that are related to the specific behavior.

15. The method of claim 1, further comprising:
- receiving a request to identify and monitor a given device from the plurality of devices;
- discovering the given device by searching for devices within a specific Internet Protocol range;
- initiating a remote procedure call, via a remote procedure call tracking component on a polling proxy service;
- completing discovery of the given device via a remote procedure call execution component executing on a polling client of the customer agentless software data collector; and
- returning discovery results to the data center via the polling proxy service.

16. The method of claim 1, further comprising:
- remotely initiating system discovery at the customer agentless software data collector with the one or more remote procedure calls;
- remotely initiating changes to settings of the customer agentless software data collector with the one or more remote procedure calls;
- initiating the customer agentless software data collector with the one or more remote procedure calls to respond to a real-time analytics inquiry; and
- passively polling analytics data from the plurality of devices with the customer agentless software data collector at predetermined time intervals.

* * * * *